US011047368B2

(12) United States Patent
Hoare et al.

(10) Patent No.: US 11,047,368 B2
(45) Date of Patent: Jun. 29, 2021

(54) SYSTEMS AND METHODS FOR MAINTAINING WIND TURBINE BLADES (71) Applicant: General Electric Company, Schenectady, NY (US)

(72) Inventors: John Robert Hoare, Latham, NY (US); Todd William Danko, Niskayuna, NY (US); Justin Foehner, Niskayuna, NY (US); Douglas R. Forman, Niskayuna, NY (US); Judith Ann Guzzo, Niskayuna, NY (US); Shiraj Sen, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/718,904

(22) Filed: Dec. 18, 2019

(65) Prior Publication Data

US 2021/0017963 A1    Jan. 21, 2021

Related U.S. Application Data (60) Provisional application No. 62/874,623, filed on Jul. 16, 2019.

(51) Int. Cl.
*F03D 80/50* (2016.01)
*G06T 19/00* (2011.01)
*H04N 13/282* (2018.01)

(52) U.S. Cl.
CPC ............ *F03D 80/50* (2016.05); *G06T 19/003* (2013.01); *H04N 13/282* (2018.05); *G06T 2200/08* (2013.01)

(58) Field of Classification Search
CPC .................................................. G01N 21/954
See application file for complete search history.

(56) References Cited

U.S. PATENT DOCUMENTS 8,281,442 B2    10/2012  Eggleston
2006/0290779 A1*  12/2006  Reverte .................... E03F 7/10
                                                    348/84

(Continued)

FOREIGN PATENT DOCUMENTS

CN          205823555 U    12/2016
DE     102009022179 A1    11/2010

(Continued)

OTHER PUBLICATIONS

Hemav, drone inspection and maintenance of wind turbines, https://hemav.com/en/hemav-inspeccion-mantenimiento-aerogeneradores-drones/, date visited Dec. 18, 2019.

(Continued)

*Primary Examiner* — Clifford Hilaire
(74) *Attorney, Agent, or Firm* — Armstrong Teasdale LLP (57) ABSTRACT A system for use in maintaining a wind turbine blade includes a motorized apparatus sized to fit within an interior cavity of the wind turbine blade and configured to travel along a length of the wind turbine blade on an interior surface when the wind turbine blade is in a substantially horizontal position. The motorized apparatus includes a body, a drive system configured to move the body, and a camera coupled to the body. The camera is configured to capture at least one image of the interior surface. The system also includes a controller configured to map the at least one image onto a model of the interior surface. The system also includes an operator interface including a display device. The operator interface is configured to display the model on the display device and receive user input allowing an operator to interact with the model.

19 Claims, 9 Drawing Sheets (56) References Cited

U.S. PATENT DOCUMENTS

| | | |
|---|---|---|
| 2011/0140060 A1 | 6/2011 | Olson et al. |
| 2013/0300855 A1 | 11/2013 | Fritz et al. |
| 2014/0140848 A1* | 5/2014 | Fuertes Thomas ..... F03D 80/50 |
| | | 416/61 |
| 2016/0021285 A1 | 1/2016 | Nadler et al. |
| 2017/0276651 A1 | 9/2017 | Hall |
| 2017/0284971 A1 | 10/2017 | Hall |
| 2018/0322699 A1 | 11/2018 | Gray |
| 2019/0302034 A1* | 10/2019 | Watanabe ............ G01N 21/954 |

FOREIGN PATENT DOCUMENTS

| | | |
|---|---|---|
| EP | 2530311 A2 | 12/2012 |
| EP | 3312418 A1 | 4/2018 |
| WO | 2016101953 A1 | 6/2016 |

OTHER PUBLICATIONS

Rovion Internal inspection of wind rotor blades, iPEK International GmbH, Sep. 2014.
Internal Blade Inspection, AtSite, www.atsite.dk, date visited Dec. 16, 2019.

* cited by examiner

SYSTEMS AND METHODS FOR MAINTAINING WIND TURBINE BLADES

CROSS-REFERENCE TO RELATED APPLICATIONS

This application claims priority to U.S. Provisional Patent Application Ser. No. 62/874,623, filed on Jul. 16, 2019, the disclosure of which is hereby incorporated by reference in its entirety.

BACKGROUND

The field of the disclosure relates to wind turbines, and more particularly to systems for maintaining wind turbine blades.

At least some known wind turbines include a rotor having multiple blades. The rotor is sometimes coupled to a housing, or nacelle, that is positioned on top of a base, for example, a tubular tower. At least some known utility grade wind turbines, i.e., wind turbines designed to provide electrical power to a utility grid, have blades having predetermined shapes and dimensions. The blades transform kinetic wind energy into blade aerodynamic forces that induce a mechanical rotational torque to drive one or more generators, subsequently generating electric power.

During operation, the wind turbine blades are exposed to environmental conditions which may change the characteristics of the wind turbine blades and affect operation of the wind turbine. For example, sometimes the wind turbine blades are struck by lightning, contacted by animals and/or debris, or exposed to other harsh conditions. As a result, the wind turbine blades may develop cracks or other defects. Accordingly, the wind turbine blades are routinely inspected and, if necessary, repaired. For example, a person may crawl within an interior cavity of each wind turbine blade along the length of the wind turbine blade to inspect and/or repair the interior of the wind turbine blades. However, such manual inspections require at least one person to work within a confined space. Sometimes, a machine is deployed within the interior cavity for inspection or repair of the wind turbine blade. However, the interior cavity of the wind turbine blade includes obstacles such as structural members and adhesive which can be difficult for the machine to traverse and may result in the machine becoming trapped within the interior cavity. In addition, at least some known machines are not capable of providing a complete image of the interior cavity of the wind turbine blade.

Accordingly, it is desirable to provide a system for use in maintaining a wind turbine blade that is able to travel within the interior cavity of the wind turbine blade to inspect and/or repair the wind turbine blade without requiring a person to enter the interior cavity.

BRIEF DESCRIPTION

In one aspect, a system for use in maintaining a wind turbine blade is provided. The wind turbine blade has an interior surface defining an interior cavity. The system includes a motorized apparatus sized to fit within the interior cavity and configured to travel along a length of the wind turbine blade on the interior surface and through the interior cavity when the wind turbine blade is in a substantially horizontal position. The motorized apparatus includes a body, a drive system configured to move the body through the interior cavity, and a camera coupled to the body and configured to capture at least one image of the interior surface. The system also includes a controller communicatively coupled to the motorized apparatus. The controller is configured to receive the at least one image and map the at least one image onto a model of the interior surface. The system also includes an operator interface including a display device and communicatively coupled to the controller. The operator interface is configured to display the model on the display device and receive operator input allowing an operator to interact with the model and selectively view different areas of the interior surface In another aspect, a controller for a motorized apparatus for use in maintaining a wind turbine blade is provided. The wind turbine blade has an interior surface defining an interior cavity. The controller is configured to send instructions to the motorized apparatus when the motorized apparatus is within the interior cavity. The motorized apparatus includes a body sized to fit within the interior cavity and a drive system configured to move the body along a length of the wind turbine blade through the interior cavity while the wind turbine blade is in a substantially horizontal position. The controller is also configured to receive, from a camera of the motorized apparatus, at least one image of the interior surface of the interior cavity. The controller is also configured to map the at least one image of the interior surface onto a model of the interior surface. An operator is able to interact with the model and selectively view different areas of the interior surface.

In yet another aspect, a method for inspecting at least one wind turbine blade is provided. The method includes positioning the wind turbine blade in a substantially horizontal position and positioning a motorized apparatus within the wind turbine blade. The motorized apparatus includes a camera. The method also includes driving the motorized apparatus along a length of the wind turbine blade through an interior cavity defined by an interior surface of the wind turbine blade, capturing at least one first image of the interior, and capturing at least one second image of the interior surface. The method further includes combining the at least one first image and the at least one second image of the interior surface to provide at least one combined image of the interior surface and mapping the combined image of the interior surface onto a model.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

As used herein, the term "blade" is intended to be representative of any device that provides reactive force when in motion relative to a surrounding fluid. As used herein, the term "wind turbine" is intended to be representative of any device that generates rotational energy from wind energy, and more specifically, converts kinetic energy of wind into mechanical energy.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, an analog computer, a programmable logic controller (PLC), and application specific integrated circuit (ASIC), and other programmable circuits, and these terms are used interchangeably herein. In the embodiments described herein, "memory" may include, but is not limited to, a computer-readable medium, such as a random access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a touchscreen, a mouse, and a keyboard. Alternatively, other computer peripherals may also be used that may include, for example, but not be limited to, a scanner. Furthermore, in the exemplary embodiment, additional output channels may include, but not be limited to, an operator interface monitor, heads-up display, or a display device. Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an ASIC, a PLC, a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

Embodiments described herein relate to a system for inspecting and/or repairing wind turbines. The system includes a motorized apparatus that is configured to travel along a length of a wind turbine blade through an interior cavity of the wind turbine blade. Specifically, the motorized apparatus is configured to travel across an interior surface of the wind turbine blade while the wind turbine blade is positioned in a substantially horizontal position. The wind turbine blade may be positioned at a substantially horizontal position while on the ground or attached to a tower. The motorized apparatus includes at least one camera that is configured to provide a 360-degree image of the interior cavity of the wind turbine blade. The motorized apparatus sends information to a controller including an operator interface. The operator interface includes a display device and is configured to display the 360-degree image and, in some embodiments, allow an operator to interact with the 360-degree image. As a result, the system described herein enables inspection and/or repair of the wind turbine blade without requiring a person to crawl into the interior cavity of the wind turbine blade and eliminates confined space requirements. Also, the system described herein reduces the time required to inspect and/or repair wind turbine blades and provides deeper access into the blades.

Figure 1:
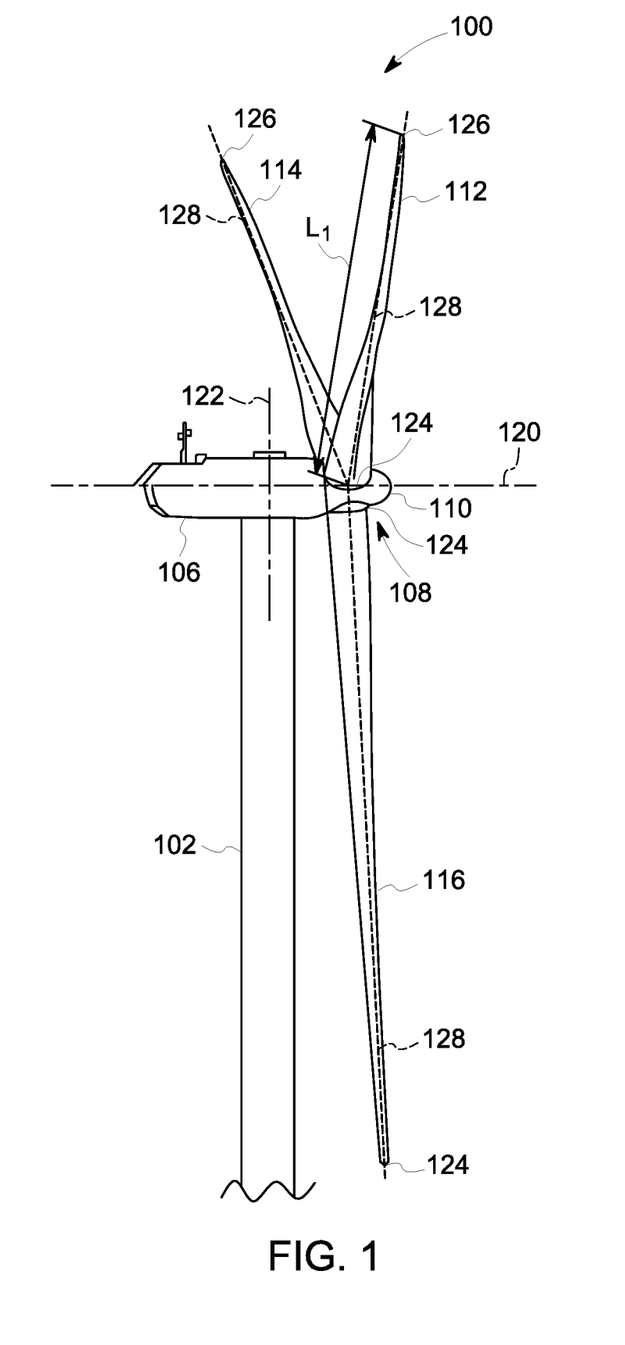
FIG. 1 is a perspective view of an exemplary wind turbine.

FIG. 1 is a schematic perspective view of an exemplary wind turbine 100. In the exemplary embodiment, wind turbine 100 is a horizontal axis wind turbine. Wind turbine 100 includes a tower 102 extending from a supporting surface (not shown), a nacelle 106 coupled to tower 102, and a rotor 108 coupled to nacelle 106. Rotor 108 has a rotatable hub 110 and a plurality of blades 112, 114, 116 coupled to rotatable hub 110. In the exemplary embodiment, rotor 108 has a first blade 112, a second blade 114, and a third blade 116. In alternative embodiments, rotor 108 has any number of blades 112, 114, 116 that enables wind turbine 100 to function as described herein. In the exemplary embodiment, tower 102 is fabricated from tubular steel and has a cavity (not shown in FIG. 1) extending between the supporting surface and nacelle 106. In alternative embodiments, wind turbine 100 includes any tower 102 that enables wind turbine 100 to operate as described herein. For example, in some embodiments, tower 102 is any one of a lattice steel tower, guyed tower, concrete tower and hybrid tower.

In the exemplary embodiment, blades 112, 114, 116 are positioned about rotatable hub 110 to facilitate rotating rotor 108 when wind flows through wind turbine 100. When rotor 108 rotates, kinetic energy from the wind is transferred into usable mechanical energy, and subsequently, electrical energy. During operation, rotor 108 rotates about a rotation axis 120 that is substantially parallel to the supporting surface. In addition, in some embodiments, rotor 108 and nacelle 106 are rotated about tower 102 on a yaw axis 122 to control the orientation of blades 112, 114, 116 with respect to the direction of wind. In alternative embodiments, wind turbine 100 includes any rotor 108 that enables wind turbine 100 to operate as described herein.

In the exemplary embodiment, each blade 112, 114, 116 is coupled to rotatable hub 110 at a hub end 124 and extends radially outward from rotatable hub 110 to a distal end 126. Each blade 112, 114, 116 defines a longitudinal axis 128 extending between hub end 124 and distal end 126. Also, each blade 112, 114, 116 includes a body 134 (shown in FIG. 2) extending from hub end 124 to distal end 126 and defining a length, indicated generally at $L_1$, of respective blade 112, 114, 116. With additional reference to FIG. 4, each body 134 includes a front wall 224, a back wall 226 opposite front wall 224, and sidewalls 228 extending between front wall 224 and back wall 226. In alternative embodiments, wind turbine 100 includes any blade 112, 114, 116 that enables wind turbine 100 to operate as described herein.

Figure 2:
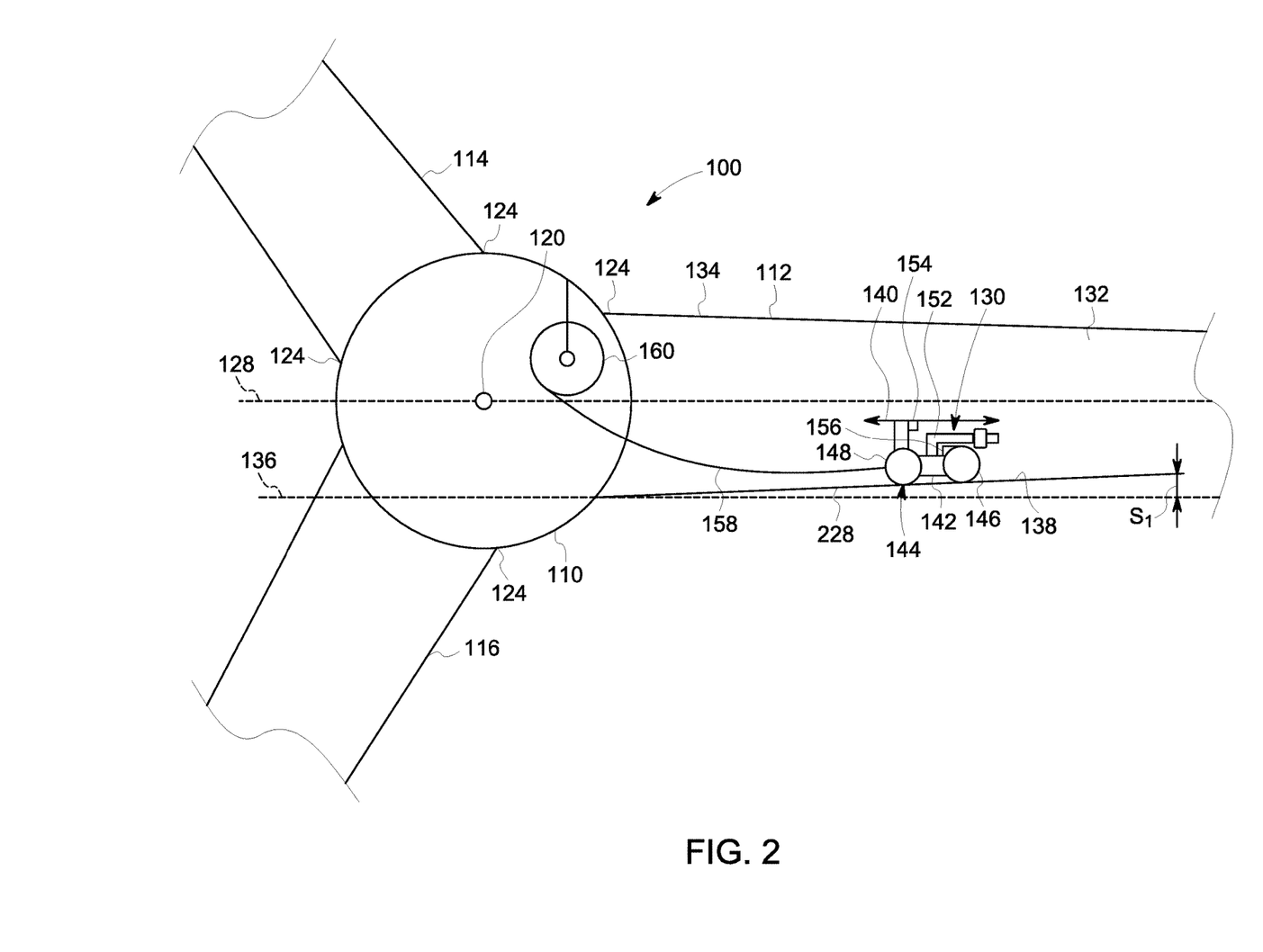
FIG. 2 is a schematic sectional view of a portion of the wind turbine shown in FIG. 1 with a motorized apparatus traveling through an interior cavity of a wind turbine blade of the wind turbine.

FIG. 2 is a schematic sectional view of a portion of wind turbine 100 with a motorized apparatus 130 traveling through an interior cavity 132 of first blade 112 of wind turbine 100. In the exemplary embodiment, first blade 112 is in a horizontal position, i.e., first blade 112 is positioned such that longitudinal axis 128 of first blade 112 is substantially parallel to a horizontal plane 136 and the surface supporting wind turbine 100. In the exemplary embodiment, first blade 112, second blade 114, and third blade 116 are identical except for their position on wind turbine 100. Accordingly, the following description of first blade 112 likewise applies to second blade 114 and third blade 116.

In the exemplary embodiment, first blade 112 is generally hollowed within body 134 and an interior surface 138 of first blade 112 defines interior cavity 132. In alternative embodiments, body 134 includes a plurality of blade support structures (not shown) such as, for example and without limitation, sparcap and sparweb supports. In such embodiments, the blade support structures extend within and support body 134. In further alternative embodiments, body 134 includes an internal filler material (e.g., a polyurethane foam) located within at least a portion of body 134. In yet further alternative embodiments, first blade 112 includes any internal structure that enables blade 112 to function as described herein.

Also, in the exemplary embodiment, motorized apparatus 130 is configured to travel through interior cavity 132 of first blade 112 along length $L_1$ (shown in FIG. 1) of first blade 112 from hub end 124 to distal end 126 (shown in FIG. 1). Specifically, in the exemplary embodiment, motorized apparatus 130 travels across a portion of interior surface 138 defined by a sidewall 228 of first blade 112 extending from hub end 124 to distal end 126 (shown in FIG. 1). In the exemplary embodiment, first blade 112 is positioned such that the portion of interior surface 138 that motorized apparatus 130 travels across has a slope $S_1$ in a range of about −30 degrees to about 30 degrees relative to horizontal plane 136. Accordingly, motorized apparatus 130 facilitates inspection and repair of first blade 112 within interior cavity 132 at locations that are inaccessible from an exterior of first blade 112. Moreover, motorized apparatus 130 is self-propelled, meaning that motorized apparatus 130 moves within interior cavity 132 without an external force acting on motorized apparatus 130. As a result, an operator is not required to enter the interior cavity 132 of first blade 112 for inspections and/or repair.

During operation, motorized apparatus 130 enters interior cavity 132 of first blade 112 from hub 110 through hub end 124 of first blade 112. Motorized apparatus 130 travels from hub end 124 toward distal end 126 in a travel direction 140. In some embodiments, motorized apparatus 130 traverses or avoids one or more structures within interior cavity 132. After motorized apparatus 130 approaches distal end 126, motorized apparatus 130 may return to hub end 124 by traveling towards hub end 124. After completing at least one circuit within interior cavity 132, motorized apparatus 130 exits first blade 112 through hub end 124. In some embodiments, motorized apparatus 130 travels at least two times between hub end 124 and distal end 126 because interior cavity 132 is divided by structures.

Also, in the exemplary embodiment, the size of interior cavity 132 constricts toward a tip at distal end 126. Accordingly, the size of interior cavity 132 may limit the distance that motorized apparatus 130 can travel along first blade 112. In the exemplary embodiment, motorized apparatus 130 is able to travel farther than an operator crawling through interior cavity 132 because motorized apparatus 130 is smaller than an operator is. For example, motorized apparatus 130 is configured to travel at least a majority of length $L_1$, i.e., greater than 50% of length $L_1$. In some embodiments, motorized apparatus 130 is configured to travel at least 75% of length $L_1$. In the exemplary embodiment, $L_1$ is approximately 48 meters and motorized apparatus 130 is configured to travel a distance in a range of about 34 meters to about 36 meters away from hub 110. In further embodiments, motorized apparatus 130 is configured to travel the entire length $L_1$ of first blade 112.

As motorized apparatus 130 travels through interior cavity 132, motorized apparatus 130 is used to inspect and/or repair any interior components of first blade 112. For example, in some embodiments, motorized apparatus 130 is used to generate at least one image of interior surface 138 and the image is examined to determine whether repairs are necessary. If repairs are necessary, motorized apparatus 130 can be used to repair interior surface 138. For example, in some embodiments, motorized apparatus 130 patches a damaged portion of interior surface 138. Interior surface 138 may be any surface within interior cavity 132 of first blade 112.

Motorized apparatus 130 includes a body 142 sized to fit within interior cavity 132 and a drive system 144. Drive system 144 is coupled to body 142 and is configured to move body 142 relative to first blade 112. Drive system 144 includes a front set of wheels 146, a rear set of wheels 148, and a motor (not shown) drivingly coupled to wheels 146, 148. A power source, such as a battery, provides power for operation of the motor. During operation, the motor induces rotation of wheels 146, 148 relative to body 142. Motorized apparatus 130 moves along surface 138 as wheels 146 rotate in contact with surface 138. In the exemplary embodiment, wheels 146, 148 include a rubber material and are configured to grip surface 138 and facilitate motorized apparatus 130 traversing obstacles. In alternative embodiments, motorized apparatus 130 includes any drive system 144 that enables motorized apparatus 130 to operate as described. For example, in some embodiments, drive system 144 includes a drive mechanism other than wheels 146, such as treads, tracks, worms, legs, and/or electromagnetic or fluidic locomotion mechanisms.

In addition, in the exemplary embodiment, a maintenance device 152 is coupled to body 142. In some embodiments, maintenance device 152 is movable relative to body 142. In the exemplary embodiment, maintenance device 152 includes at least one camera mounted to body 142 and configured to capture 360-degree images. In the exemplary embodiment, maintenance device 152 includes an omnidirectional camera having a spherical field of view. In alternative embodiments, maintenance device 152 includes any camera that enables maintenance device 152 to operate as described herein. For example, in some embodiments, maintenance device 152 includes a plurality of cameras which are used in conjunction to provide a 360-degree field of view.

In alternative embodiments, motorized apparatus 130 includes any maintenance device 152 that enables motorized apparatus 130 to operate as described herein. For example, in some embodiments, maintenance device 152 includes, without limitation, any of the following: an applicator, a drill, a grinder, a heater, a welding electrode, a sprayer, an optical sensor (e.g., visible, infrared, and/or multi-spectral sensor), a mechanical sensor (e.g., stylus profilometer, coordinate measurement probe, load transducer, linear variable differential transformer), a thermal sensor (e.g., pyrometer, thermocouple, resistance temperature detector), a magnetic sensor, an acoustic sensor (e.g., piezoelectric, microphone, ultrasound), and an electromagnetic sensor (e.g., eddy current, potential drop, x-ray). In some embodiments, maintenance device 152 is used to provide information for steering motorized apparatus 130 and/or to perform a maintenance operation.

In some embodiments, motorized apparatus 130 includes a steering component (not shown) that controls a motor to move an articulated steering mechanism and turn wheels 146, 148 such that motorized apparatus 130 is steered as it translates forward or backward. In other embodiments, drive system 144 is a differential drive system in which wheels 146, 148 are driven at different speeds and/or in different directions to steer motorized apparatus 130. In some embodiments, motorized apparatus 130 is configured to switch between a plurality of steering modes. In the exemplary embodiment, motorized apparatus 130 is configured to operate in a front wheel steering mode in which front wheels 146 are used to steer motorized apparatus 130 and a rear wheel steering mode in which rear wheels 148 are used to steer motorized apparatus 130. Motorized apparatus 130 may operate in the front wheel steering mode as motorized apparatus 130 travels from hub end 124 toward distal end 126 and may operate in the rear wheel steering mode as motorized apparatus 130 travels from distal end 126 toward hub end 124. In further embodiments, motorized apparatus 130 has an all-wheel steering mode (e.g., a 4-wheel steering mode for motorized apparatus 130 shown in FIG. 2) and/or a crab-style steering mode in which all wheels are turned in the same direction. In alternative embodiments, motorized apparatus 130 has any steering mode that enables motorized apparatus 130 to operate as described herein.

In some embodiments, motorized apparatus 130 is at least partially automated and a steering component steers motorized apparatus 130 based at least in part on information from any components of motorized apparatus 130, such as maintenance device 152.

Also, in the exemplary embodiment, motorized apparatus 130 includes a camera 154 mounted to body 142 and configured to provide information for steering motorized apparatus 130. For example, camera 154 provides a live stream of the environment surrounding motorized apparatus 130. Camera may be positionable relative to body 142. In the exemplary embodiment, camera 154 is positionable between a front facing orientation and a rear facing orientation when motorized apparatus 130 switches between the front wheel steering mode and the rear wheel steering mode.

In addition, in the exemplary embodiment, motorized apparatus 130 includes a light source 156 configured to illuminate at least a portion of interior cavity 132 to facilitate steering of motorized apparatus 130 and/or to allow maintenance device 152 to capture images. Light source 156 may flash at regular intervals and/or light source 156 may illuminate interior cavity 132 substantially continuously as motorized apparatus 130 travels along blade 112, 114, 116. In some embodiments, light source 156 is controlled in coordination with maintenance device 152 to provide optimum lighting for image capture. Light source 156 is coupled to body 142 and, in some embodiments, is positionable relative to body 142. In alternative embodiments, motorized apparatus 130 includes any light source 156 that enables motorized apparatus 130 to operate as described herein.

Also, in the exemplary embodiment, a tether 158 is coupled to motorized apparatus 130 and extends from motorized apparatus 130 to hub 110 as motorized apparatus 130 travels along length $L_1$ (shown in FIG. 1) of first blade 112. A tension control mechanism 160 is mounted within hub 110 and controls the tension in tether 158 as motorized apparatus 130 moves. In some embodiments, tether 158 is used to retrieve motorized apparatus 130 if motorized apparatus 130 is stuck or disabled within interior cavity 132. In addition, tether 158 may provide an indication of the distance that motorized apparatus 130 has traveled along first blade 112. For example, in some embodiments, the distance that motorized apparatus 130 has traveled from hub 110 is determined based on the amount of tether 158 that is reeled out from tension control mechanism 160. In some embodiments, tether 158 may be used to provide power and/or communications for motorized apparatus 130. In alternative embodiments, motorized apparatus 130 includes any tether 158 that enables motorized apparatus 130 to function as described herein. In some embodiments, tether 158 is omitted.

Figure 3:
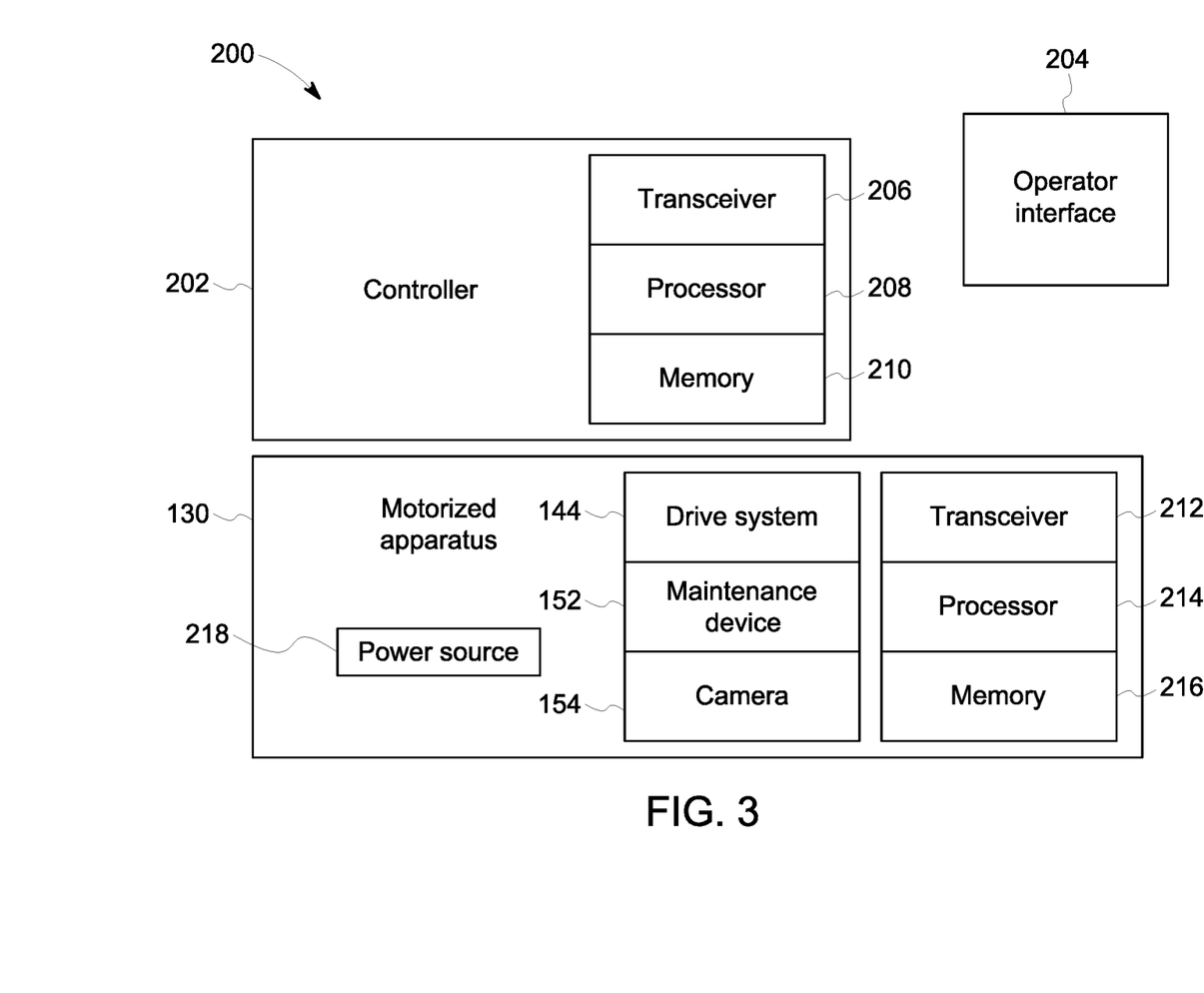
FIG. 3 is a block diagram of a system for use in maintaining the wind turbine shown in FIG. 1.

FIG. 3 is a block diagram of an exemplary system 200 for use in maintaining wind turbine 100 (shown in FIG. 1). System 200 includes motorized apparatus 130, a controller 202, and an operator interface 204. Motorized apparatus 130 includes maintenance device 152, camera 154, and drive system 144. In alternative embodiments, system 200 includes any component that enables system 200 to operate as described herein. For example, in some embodiments, camera 154 is omitted. In further embodiments, operator interface 204 is omitted.

In addition, in the exemplary embodiment, controller 202 includes a transceiver 206, a processor 208, and a memory 210. In some embodiments, controller 202 is positioned remotely from motorized apparatus 130. Transceiver 206 is communicatively coupled with motorized apparatus 130 and is configured to send information to and receive information from a transceiver 212 of motorized apparatus 130. In the exemplary embodiment, transceiver 206 and transceiver 212 communicate wirelessly. In alternative embodiments, motorized apparatus 130 and controller 202 communicate in any manner that enables system 200 to operate as described herein. For example, in some embodiments, controller 202 and motorized apparatus 130 exchange information through a wired link extending between motorized apparatus 130 and controller 202.

In addition, in the exemplary embodiment, motorized apparatus 130 includes a processor 214 and a memory 216. Processor 214 is configured to execute instructions for controlling components of motorized apparatus 130, such as maintenance device 152 and drive system 144. In alternative embodiments, motorized apparatus 130 includes any processor 214 that enables system 200 to operate as described herein. In some embodiments, processor 214 is omitted.

In some embodiments, maintenance device 152 includes one or more sensors and/or repair tools. For example, in the exemplary embodiment, maintenance device 152 includes a camera configured to provide a 360-degree image of interior cavity 132 (shown in FIG. 2). Motorized apparatus 130 transmits information such as images captured by maintenance device 152 to controller 202 for processing and/or display.

In the exemplary embodiment, controller 202 is configured to receive images from motorized apparatus 130 and map the images onto a three dimensional model or a viewing interface for more effective viewing. In some embodiments, controller 202 receives a 360 degree image from motorized apparatus 130 (e.g., an image constructed by a 360 degree camera) and maps the 360 degree image to a navigable three dimensional model or user interface. In the exemplary embodiment, the 360 degree image is generated by the camera using a "stitching" technique for combining multiple images into a single 360 degree image. In an alternative embodiment, controller 202 may stitch multiple images together to form a 360 degree image. In alternative embodiments, controller 202 may receive a 360 degree image taken or constructed through any mechanism.

Figure 5:
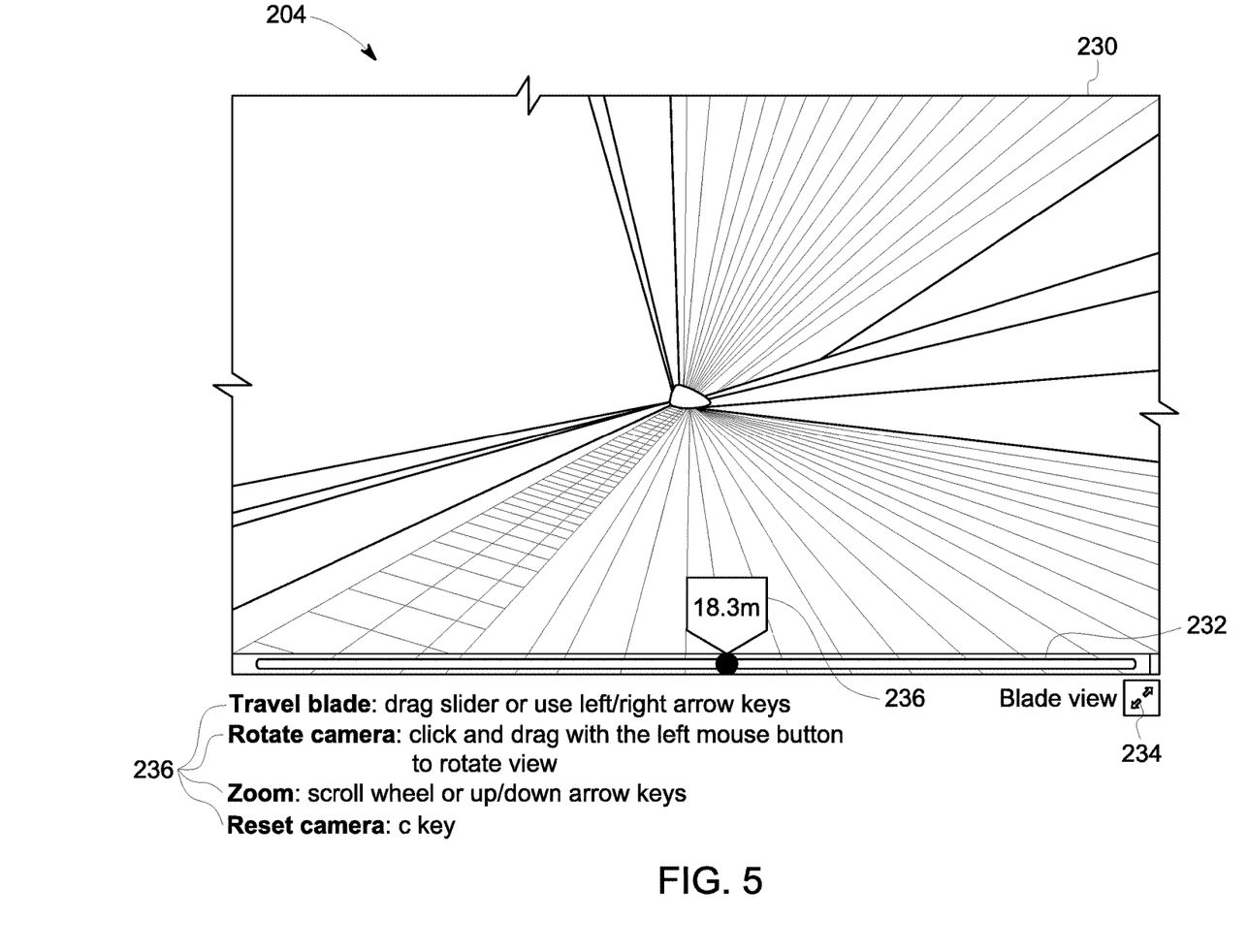
FIG. 5 is a view of an operator interface of the system shown in FIG. 4.

In some embodiments, controller 202 is configured to receive equirectangular image outputs (e.g., 360 degree images) from a camera and map the image outputs to a navigable three dimensional sphere that enables a user to more effectively view and interact with the images. In further embodiments, controller 202 maps a single equirectangular image to a navigable three dimensional sphere. For example, as shown in FIG. 5, controller 202 may map a 360 degree image to a 360 degree sphere navigable using a slider bar to control the view. In some embodiments, controller 202 utilizes three dimensional panorama mapping to map any received 360 degree images to a 360 degree panorama-type view. In alternative embodiments, controller 202 may map the 360 degree image onto any model, surface, or user interface for viewing by a user. In one example, controller 202 maps the 360 degree image onto a virtual reality ("VR") space, such that a user can view a VR environment based on the 360 degree image. In other words, the user can navigate the 360 degree image using a VR headset.

In some embodiment, controller 202 is configured to map multiple images onto a single three dimensional model. For example, controller 202 may receive a plurality of equirectangular images captured by a camera, wherein each equirectangular image was captured by the camera when motorized apparatus 130 was positioned at a different location within interior cavity 132. In other words, each equirectangular image depicts a different area of interior cavity 132. Controller 202 may further map the plurality of equirectangular images into a single three dimensional model, such that multiple 360-degree panorama views are contained within the model. In further embodiments, controller 202 is configured to receive images from motorized apparatus 130 and combine the images to provide a combined image of interior cavity 132 (shown in FIG. 2). For example, controller 202 is configured to combine a plurality of 360-degree images provided by maintenance device 152 together and provide a substantially complete view of interior cavity 132 (shown in FIG. 2).

Also, in the exemplary embodiment, operator interface 204 is configured to display information relating to the characteristics detected by maintenance device 152 for interpretation by the operator. Operator interface 204 may be included on a remote computing device (not shown) and/or may be incorporated with controller 202. Operator interface 204 may include, among other possibilities, a web browser and/or a client application. For example, in some embodiments, operator interface 204 displays images of interior surface 138 (shown in FIG. 2) based on received signals. In some embodiments, operator interface 204 allows an operator to input and/or view information relating to control of motorized apparatus 130. In the exemplary embodiment, operator interface 204 is configured to display information relating to the state of one or more of maintenance device 152 and a power source 218 for interpretation by the operator. For example, state information may include the position of motorized apparatus 130 along length $L_1$ of blade 112, 114, 116 (shown in FIG. 1). State information may also include charge status of power source 218 and/or current draw on the various drive and positioning motors. Processor 208 translates operator inputs into steering, tool motion, camera control, sensor control, sensor motion, and/or any other commands and sends information via transceiver 206 to motorized apparatus 130 via transceiver 212. In some embodiments, operator control of motorized apparatus 130 is in real time, such as through a joystick, keyboard, touchscreen, a remote motion capture system, and a wearable motion capture system or other interface having similar function. In other embodiments, motorized apparatus 130 is controlled partially or wholly according to a pre-programmed routine. In further embodiments, motorized apparatus 130 is at least partially automated. In some embodiments, an operator inputs information such as operation goals or conditional directions. In further embodiments, information, such as information received by controller 202 from motorized apparatus 130, control data sent to motorized apparatus 130, and additional operator inputs or state information (e.g., location, time, orientation, datalink quality, battery levels, repair material levels, failure mode indicators), is logged into memory 216 and/or memory 210.

In further embodiments, controller 202 is configured to recognize features such as defects of interior surface 138. For example, in some embodiments, controller 202 includes a processor configured to run analytical defect recognition programs. Accordingly, controller 202 analyzes information provided by one or more sensors such as maintenance device 152 and/or camera 154 and analyzes the information to provide at least partially automated defect recognition. In some embodiments, the defects are highlighted in an output provided to the operator.

Moreover, in the exemplary embodiment, controller 202 is positioned on the exterior of first blade 112. For example, controller 202 may be positioned within hub 110 (shown in FIG. 2) and communicates with motorized apparatus 130 positioned within first blade 112. For example, controller 202 is configured to send information to motorized apparatus 130 relating to the propulsion and/or steering of motorized apparatus 130 while motorized apparatus 130 is moving within interior cavity 132 of first blade 112 through a wireless connection. In alternative embodiments, controller 202 and motorized apparatus 130 are configured in any manner that enables system 200 to operate as described herein.

In addition, in some embodiments, motorized apparatus 130 is steered based at least in part on information received from maintenance device 152 and/or camera 154. For example, structures within interior cavity 132 may be detected based on information provided by maintenance device 152 and/or camera 154. Accordingly, steering of motorized apparatus 130 is adjusted based on the detected structures. In some embodiments, information relating to the structures is displayed on operator interface 204. In further embodiments, the steering of motorized apparatus 130 is adjusted at least in part automatically by controller 202 based on information provided by maintenance device 152, camera 154, and/or any other devices. In further embodiments, the steering is adjusted based at least partially on operator inputs. In some embodiments, controller 202 is configured to assist operator control of motorized apparatus 130 based on detected structures. For example, in some embodiments, controller 202 limits and/or automatically adjusts the speed of motorized apparatus 130 when motorized apparatus 130 is approaching and/or traversing a structure. In alternative embodiments, motorized apparatus 130 is steered in any manner that enables motorized apparatus 130 to operate as described herein.

Figure 4:
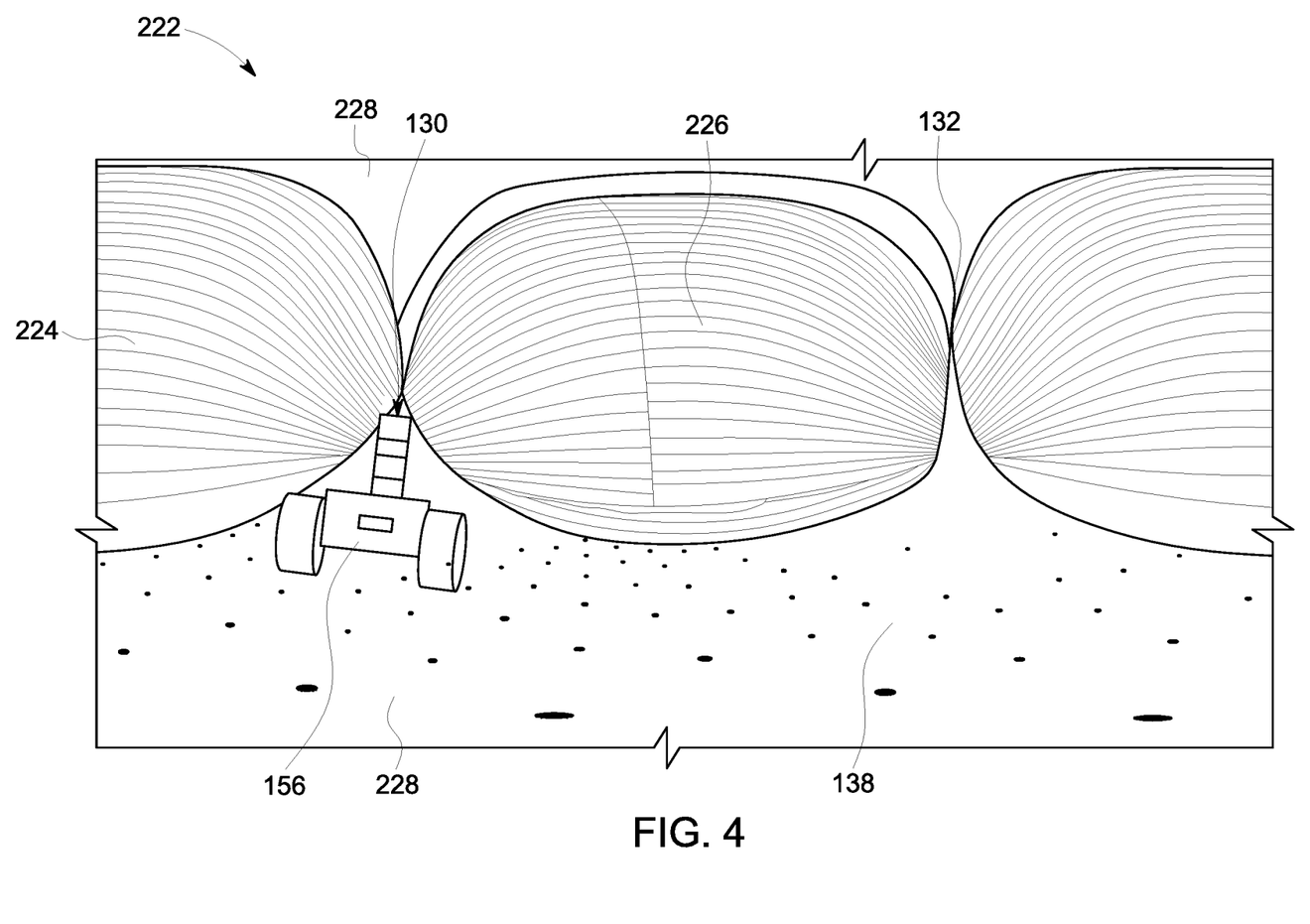
FIG. 4 is an example image provided by the system shown in FIG. 4.

FIG. 4 is an example of an image 222 provided by system 200 (shown in FIG. 4). Image 222 shows a complete 360-degree view around motorized apparatus 130. For example, image 222 shows interior surfaces 138 of front wall 224, back wall 226, and sidewalls 228 of first blade 112. Accordingly, each image 222 provides a substantially complete view of the portion of interior cavity 132 surrounding motorized apparatus 130. Motorized apparatus 130 is configured to provide a view of substantially the entire interior cavity 132 of blades 112, 114, 116 by traveling within interior cavity 132 and capturing images 222 along a majority of length $L_1$. In the exemplary embodiment, motorized apparatus 130 pauses within interior cavity 132 at regular intervals to capture images 222. In alternative embodiments, maintenance device 152 may capture images 222 as a continuous stream as motorized apparatus 130 travels along blade 112, 114, 116.

FIG. 5 is a view of operator interface 204 of system 200 (shown in FIG. 3). Operator interface 204 may be included on a computing device, such as controller 202 shown in FIG. 3, and presented to an operator on a screen of the computing device. Operator interface 204 includes an image viewer 230, a slide bar 232, an expand/collapse button 234, and one or more information fields 236.

Image viewer 230 shows a series of 360-view images that are combined together by controller 202 (shown in FIG. 3). In the exemplary embodiment, image viewer 230 is interactive. For example, an operator may rotate the perspective of the 360-degree image shown in image viewer 230 or pan the image, for example, by clicking and dragging the image using an input device such as a computer mouse for a non-touchscreen device or a finger for a touchscreen device. The operator may move the image along length $L_1$ of blade 112, 114, 116 (shown in FIG. 2) to a location that is farther/closer to distal end 126 by dragging slide bar 232 left/right. In addition, the operator may zoom in/out on the image using a scroll wheel, fingers, or other suitable input device. In alternative embodiments, the operator may manipulate the images shown in image viewer 230 in any manner that enables operator interface 204 to function as described herein.

Also, in the exemplary embodiment, information fields 236 display information to the operator such as instructions for viewing/manipulating images and/or characteristics detected by motorized apparatus 130 (shown in FIG. 2). In the exemplary embodiment, some information fields 236 display instructions for manipulating the image shown in image viewer 230. In addition, one information field 236 shows a location of motorized apparatus 130 along length $L_1$ (shown in FIG. 1).

Figure 6:
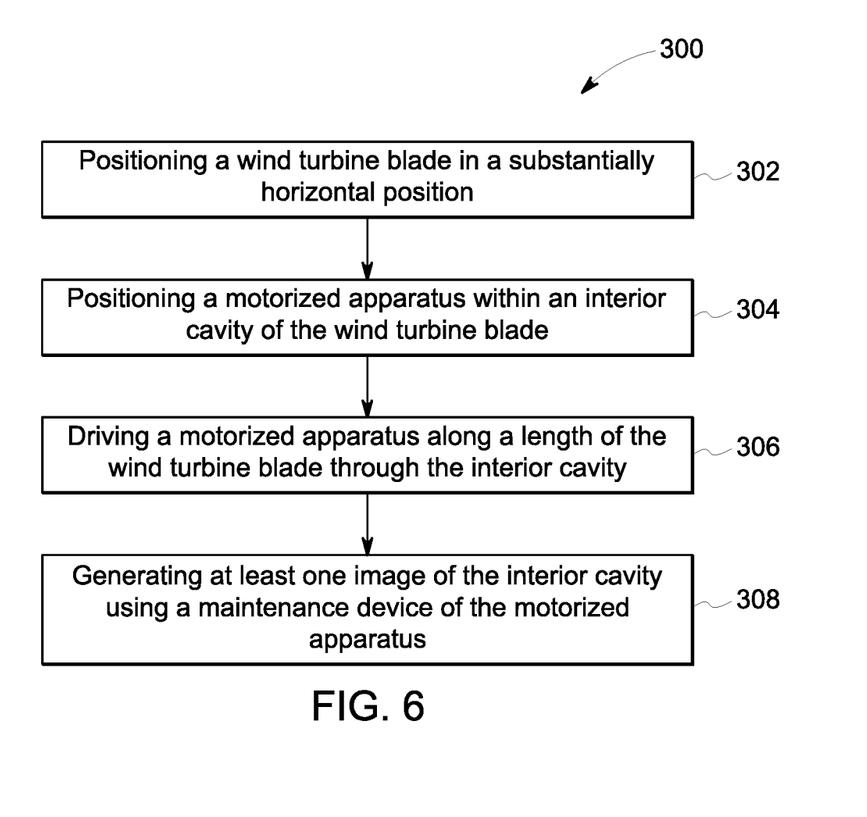
FIG. 6 is a flow chart of an exemplary method of inspecting at least one blade of the wind turbine shown in FIG. 1.

FIG. 6 is a flow diagram of an exemplary method 300 of inspecting at least one blade 112, 114, 116 (shown in FIG. 2) of wind turbine 100 (shown in FIG. 1). In reference to FIGS. 1-3 and 6, method 300 includes positioning 302 first blade 112 in a substantially horizontal position. For example, in some embodiments, rotor 108 is rotated until first blade 112 is positioned in a substantially horizontal position. In further embodiments, first blade 112 is positioned on a supporting surface, e.g., the ground, in the horizontal position. When first blade 112 is in a substantially horizontal position, motorized apparatus 130 is able to travel along a portion of surface 138 having a slope $S_1$ in a range of about −30 degrees to about 30 degrees relative to horizontal plane 136. In further embodiments, first blade 112 is positioned such that slope $S_1$ is in a range of about −5 degrees to about 5 degrees relative to horizontal plane 136.

Also, method 300 includes positioning 304 motorized apparatus 130 within interior cavity 132 of first blade 112. For example, motorized apparatus 130 is driven through hub end 124 into interior cavity 132 of first blade 112. Motorized apparatus 130 is sized and shaped to fit within interior cavity 132 and travel across surface 138 of first blade 112.

In addition, method 300 includes driving 306 motorized apparatus 130 along length $L_1$ of first blade 112 through interior cavity 132. For example, the motor rotates wheels 146, 148 in contact with surface 138 to propel motorized apparatus 130 along surface 138. In the exemplary embodiment, motorized apparatus 130 is driven along the center of interior cavity 132. In some embodiments, motorized apparatus 130 travels around obstacles or structures. In such embodiments, the structures may divide the interior cavity 132 of first blade 112 into separate compartments and motorized apparatus 130 may make two or more trips along length $L_1$ to cover the entirety of interior cavity 132.

Moreover, method 300 includes capturing 308 at least one 360-degree image of interior cavity 132 using maintenance device 152 of motorized apparatus 130. In some embodiments, controller 202 receives a series of images from motorized apparatus 130 and combines the images together to provide a substantially complete view of interior cavity 132. In addition, in some embodiments, method 300 includes displaying the 360-degree images on operator interface 204. An operator can manipulate the combined images using operator interface 204 to perform an inspection without the operator entering interior cavity 132.

After motorized apparatus 130 has completed an outward trip along length $L_1$, motorized apparatus 130 returns to hub end 124. In some embodiments, motorized apparatus 130 switches between a front wheel steering mode and a rear wheel steering mode and drives backward along length $L_1$ of blade 112. In addition, in some embodiments, motorized apparatus 130 collects data such as images as motorized apparatus 130 returns to hub end 124. In alternative embodiments, motorized apparatus 130 does not collect at least some data on the return trip and is able to travel at a higher rate of speed during the return trip than the outward trip. Motorized apparatus 130 may make any number of trips through interior cavity 132 that are necessary to collect data on and/or repair first blade 112.

Motorized apparatus 130 is used to inspect each blade 112, 114, 116 of wind turbine 100. Accordingly, in some embodiments, at least some of the previous steps are repeated to inspect second blade 114 and/or third blade 116. For example, in some embodiments, rotor 108 is rotated one or more times to move second blade 114 and/or third blade 116 into a substantially horizontal position after motorized apparatus 130 has completed the inspection of first blade 112. In further embodiments, first blade 112 and second blade 114 are positioned at equal and opposite angles that allow motorized apparatus 130 to travel through each blade 112, 114 without repositioning rotor 108 between inspections. For example, in some embodiments, motorized apparatus 130 is configured to traverse a 60-degree slope $S_1$ and first blade 112 and second blade 114 are simultaneously positioned for inspection by rotating rotor 108 such that first blade 112 and second blade 114 each extend at a 60-degree angle relative to horizontal plane 136. In alternative embodiments, first blade 112, second blade 114, and/or third blade 116 are positioned on the ground and motorized apparatus 130 is driven out of one blade and into the next blade for inspection.

Figure 7:
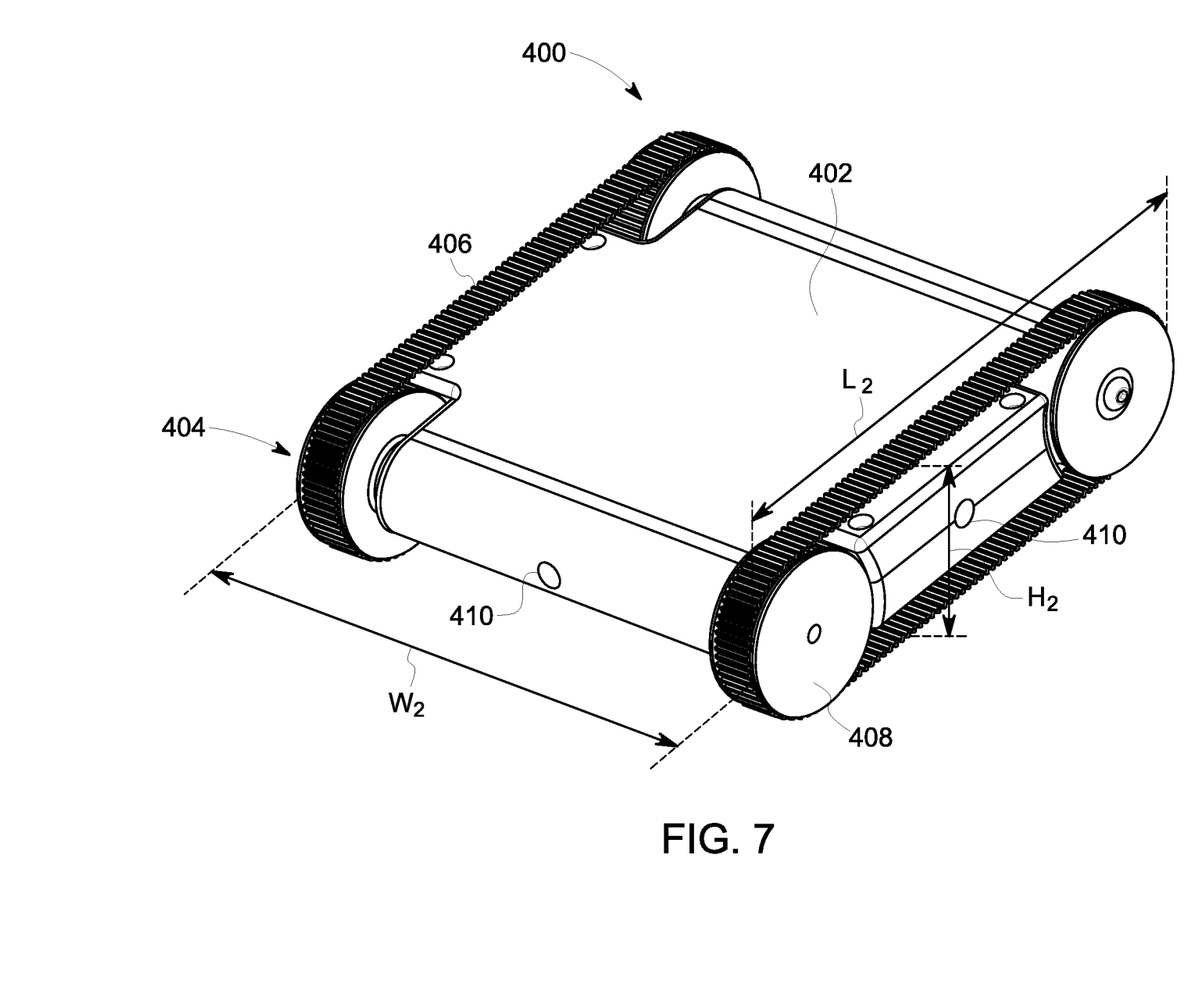
FIG. 7 is a perspective view of an exemplary embodiment of a motorized apparatus for use with the system shown in FIG. 3.
Figure 8:
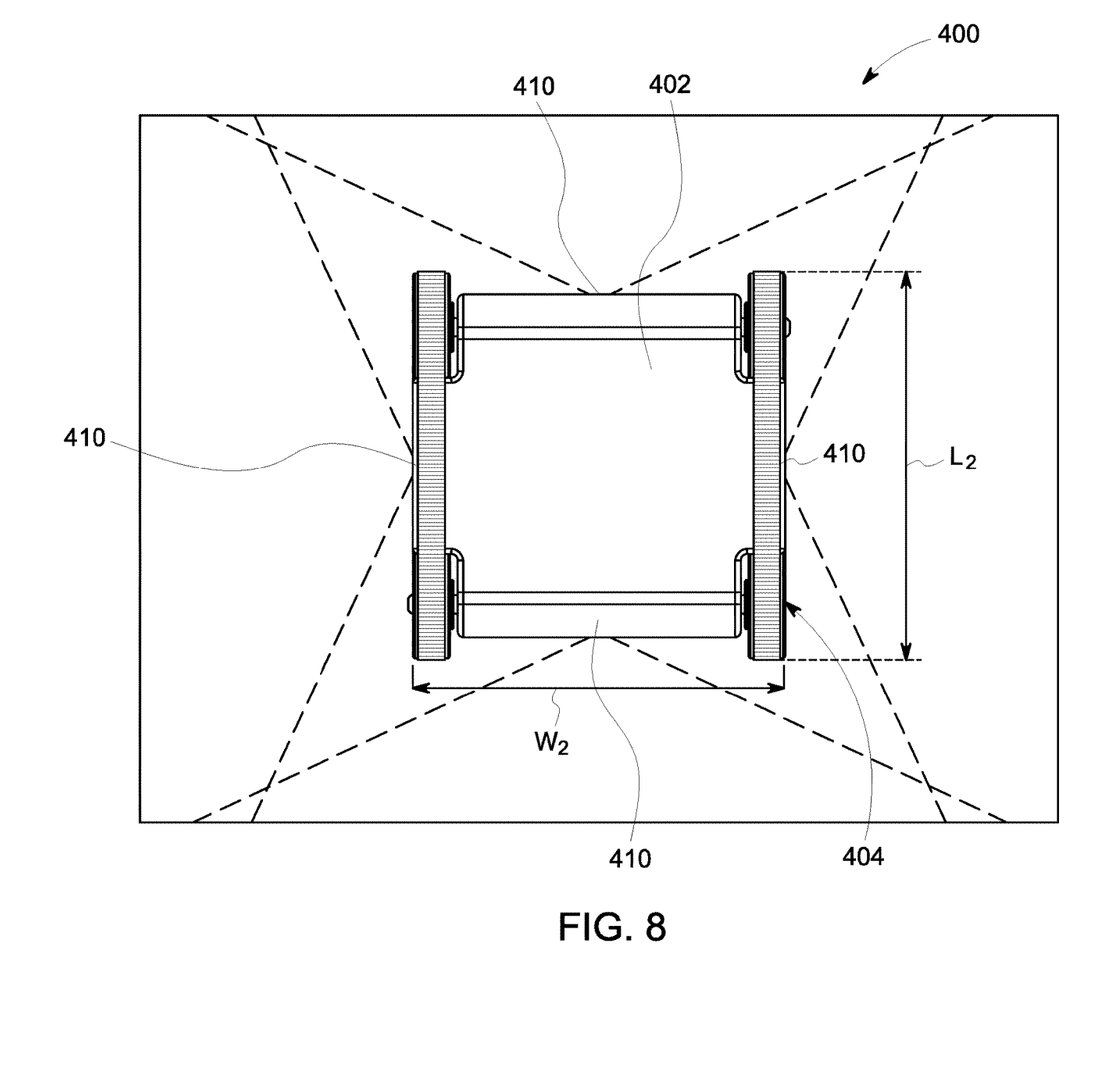
FIG. 8 is a top view of the motorized apparatus shown in FIG. 7.

FIG. 7 is a perspective view of an exemplary embodiment of a motorized apparatus 400 for use with system 200 shown in FIG. 3. FIG. 8 is a top view of motorized apparatus 400. Motorized apparatus 400 includes a body 402 sized to fit within interior cavity 132 (shown in FIG. 2). Motorized apparatus 400 has a length $L_2$, a width $W_2$, and a height $H_2$. In the exemplary embodiment, motorized apparatus 400 is substantially flat and length and width $W_2$ are each greater than height $H_2$. Accordingly, motorized apparatus 400 is able to fit deeper into interior cavity 132 (shown in FIG. 2) than taller apparatus. For example, in some embodiments, motorized apparatus 400 has length $L_2$ of no more than about 140 mm, width $W_2$ of no more than about 136 mm, and height $H_2$ of no more than about 40 mm. In alternative embodiments, motorized apparatus 400 has any body 402 that enables motorized apparatus 400 to operate as described herein.

In the exemplary embodiment, motorized apparatus 400 also includes a drive system 404. For example, drive system 404 includes crawler treads 406 extending along sides of body 402, rotors 408 supporting crawler treads 406, and a motor (not shown) configured to rotate rotors 408 to drive motorized apparatus 400 using treads 406. Drive system 404 is configured for motorized apparatus 400 to be steered in multiple directions and allows motorized apparatus 400 to operate in a normal orientation or a flipped orientation (i.e., upside down). Motorized apparatus 400 may include an inertial measurement unit (IMU) configured to detect the orientation of motorized apparatus 400 and switch the operating mode or direction of rotation of the motor based on the orientation. In alternative embodiments, motorized apparatus 400 includes any drive system 404 that enables motorized apparatus 400 to operate as described herein.

In addition, in the exemplary embodiment, at least one maintenance device 410 is coupled to body 402. Body 402 is modular and provides a sensor/tool interface that is configured to operate with a plurality of different types of maintenance devices 410. In the exemplary embodiment, maintenance devices 410 are a plurality of cameras positioned around body 402 to provide 360-degree views around motorized apparatus 400.

Figure 9:
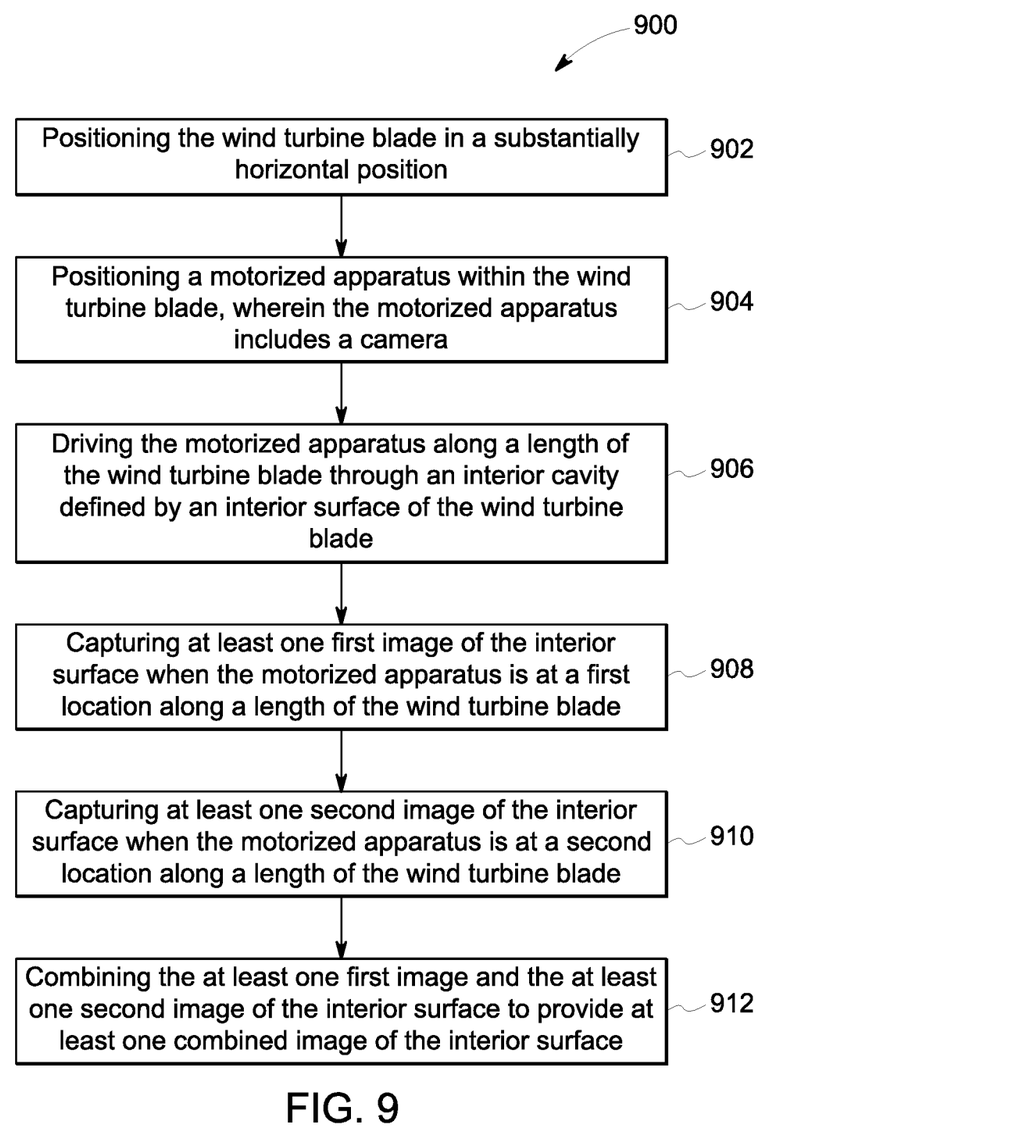
FIG. 9 is a flow chart of an exemplary method of inspecting at least one blade of the wind turbine shown in FIG. 1.

FIG. 9 is a flow diagram of exemplary method 900 of inspecting at least one blade 112, 114, 116 (shown in FIG. 2) of wind turbine 100 (shown in FIG. 1). In reference to FIGS. 1-3 and 9, method 900 includes positioning 902 wind turbine blade 112, 114, 116 in a substantially horizontal position. For example, in some embodiments, wind turbine blades 112, 114, 116 are coupled to rotor 108 of wind turbine 100 and rotor 108 is rotated about rotation axis 120 until at least one of wind turbine blades 112, 114, 116 is in a substantially horizontal position. In further embodiments, wind turbine blades 112, 114, 116 are positioned along a supporting surface in the horizontal position.

Also, in the exemplary embodiment, method 900 includes positioning 904 motorized apparatus 130 within wind turbine blade 112, 114, 116. For example, motorized apparatus 130 is driven from hub 110 through hub end 124 into interior cavity 132 of first blade 112. Method 900 further includes driving 906 motorized apparatus 130 along a length of wind turbine blade 112, 114, 116 through interior cavity 132 defined by interior surface 138 of wind turbine blade 112, 114, 116. In some embodiments, motorized apparatus 130 is driven from hub end 124 along substantially the entire length of wind turbine blade 112, 114, 116 to distal end 126. Motorized apparatus 130 is sized to fit within interior cavity 132 at distal end 126 and, therefore, is able to obtain a more complete view of interior cavity 132 than at least some known apparatus or operators which are too large to fit within distal end 126 of interior cavity 132.

In some embodiments, motorized apparatus 130 is operated by an operator positioned within hub 110. System 200 allows the operator to inspect interior cavity 132 of wind turbine blade 112, 114, 116 without the operator entering interior cavity 132. Moreover, system 200 reduces the time required for inspections of wind turbine blades 112, 114, 116 because, for example, the operator is able to remain in hub 110 during inspections and between inspections of different wind turbine blades 112, 114, 116. For example, in some embodiments, rotor 108 is positioned such that at least two of wind turbine blades 112, 114, 116 are in substantially horizontal positions at the same time.

Method 900 includes capturing 908 at least one first image of interior surface 138 when motorized apparatus 130 is at a first location along a length of wind turbine blade 112, 114, 116 and capturing 910 at least one second image of interior surface 138 when motorized apparatus 130 is at a second location along a length of wind turbine blade 112, 114, 116. In some embodiments, a camera of maintenance device 152 is configured to capture images as motorized apparatus 130 travels. In further embodiments, motorized apparatus 130 stops traveling at locations along the length of wind turbine blade 112, 114, 116 for maintenance device 152 to capture one or more images.

Additionally, in the exemplary embodiment, method 900 includes combining 912 the at least one first image and the at least one second image of interior surface 138 to provide at least one combined image of the interior surface 138. In addition, in some embodiments, maintenance device 152 is configured to capture 360-degree images of interior cavity 132 and controller 202 is configured to combine the 360-degree images at multiple locations along the length of wind turbine blade 112, 114, 116. Accordingly, system 200 provides substantially complete images of interior surface 138 of interior cavity 132 along the entire length of wind turbine blade 112, 114, 116. In addition, in some embodiments, the combined images are interactive and allow an operator to selectively view different areas of interior surface 138 of wind turbine blade 112, 114, 116.

An exemplary technical effect of the methods, systems, and apparatus described herein includes at least one of: (a)

reducing the time to inspect and/or repair wind turbine blades; (b) enabling inspection of an interior cavity of a wind turbine blade without operators entering the wind turbine blade; (c) reducing the number of operators required to perform an inspection and/or repair of a wind turbine blade; (d) improving the robustness of information provided by an inspection of an interior cavity of a wind turbine blade; (e) providing deeper access into an interior cavity blade than a person and access into the full length of the interior cavity of some blades (f) providing information having a higher quality than information obtained by a person using at least some known inspection methods and systems; and (g) providing digital inspection pedigree of internal blade inspection and maintenance.

Exemplary embodiments of systems and methods for use in maintaining wind turbine systems are described above in detail. The methods and systems are not limited to the specific embodiments described herein, but rather, components of systems and/or steps of the methods may be utilized independently and separately from other components and/or steps described herein. For example, the method may also be used in combination with other rotary machine components, and are not limited to practice only with the wind turbine system as described herein. Rather, the exemplary embodiment can be implemented and utilized in connection with many other applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for use in maintaining a wind turbine blade, the wind turbine blade having an interior surface defining an interior cavity, the system comprising:
    a motorized apparatus sized to fit within the interior cavity and configured to travel along a length of the wind turbine blade on the interior surface and through the interior cavity when the wind turbine blade is in a substantially horizontal position, said motorized apparatus comprising:
        a body;
        a drive system configured to move said body through the interior cavity; and
        a camera coupled to said body and configured to capture at least one first image of the interior surface and at least one second image of the interior surface;
    a controller communicatively coupled to said motorized apparatus and configured to:
        receive the at least first one image;
        map the at least one first image onto a first model of the interior surface;
        receive the at least one second image of the interior surface; and
        map the at least one second image onto a second model; and
    an operator interface including a display device and communicatively coupled to said controller, wherein said operator interface is configured to:
        display the first model on said display device;
        display the second model on said display device;
        receive operator input allowing an operator to select between the first model and the second model; and
        receive operator input allowing an operator to interact with at least one of the first model and the second model and selectively view different areas of the interior surface.

2. The system in accordance with claim 1, wherein the first model comprises a three dimensional model, and wherein said operator interface enables an operator to navigate views of the interior surface in at least three dimensions.

3. The system in accordance with claim 1 wherein said camera is configured to capture 360-degree images, and wherein the at least one first image is a 360-degree image of the interior surface.

4. The system in accordance with claim 1 wherein said motorized apparatus further comprises a maintenance device configured to repair the interior surface of the wind turbine blade.

5. The system in accordance with claim 1, wherein said motorized apparatus further includes at least one sensor coupled to said body and configured to detect at least one characteristic of the wind turbine blade as said motorized apparatus travels along the length of the wind turbine blade.

6. The system in accordance with claim 5, wherein said controller is further configured to receive the at least one characteristic from said at least one sensor and identify a feature of the interior surface of the wind turbine blade based on the at least one characteristic.

7. The system in accordance with claim 5, wherein said controller is further configured to:
    receive the at least one characteristic of the wind turbine blade from the sensor;
    identify a structure within the interior cavity based on the at least one characteristic; and
    transmit instructions to said drive system which cause said drive system to alter at least one of a speed and a direction of travel of said motorized apparatus.

8. The system in accordance with claim 1, wherein said controller is further configured to identify at least one feature of the interior surface based on the at least one first image of the interior surface.

9. The system in accordance with claim 1 further comprising a tether coupled to said motorized apparatus and configured to extend from said motorized apparatus to a hub of the wind turbine blade as said motorized apparatus travels along the length of the wind turbine blade.

10. The system in accordance with claim 1, wherein said drive system comprises at least one wheel configured to contact the interior surface and a motor configured to drive said at least one wheel.

11. The system in accordance with claim 10, wherein said motorized apparatus further comprises a steering component communicatively coupled to said controller and configured to steer said motorized apparatus as the drive system moves said body through the interior cavity.

12. The system in accordance with claim 1, wherein said drive system moves said motorized apparatus through the interior cavity of the wind turbine blade according to a pre-programmed routine.

13. A controller for use in maintaining a wind turbine blade, the wind turbine blade having an interior surface defining an interior cavity, said controller configured to:
  send instructions to a motorized apparatus when the motorized apparatus is within the interior cavity, the motorized apparatus including a body sized to fit within the interior cavity and a drive system configured to move the body along a length of the wind turbine blade through the interior cavity while the wind turbine blade is in a substantially horizontal position;
  receive, from a camera of the motorized apparatus, at least one first image of the interior surface of the interior cavity and at least one second image of the interior surface;
  map the at least one first image of the interior surface onto a first model of the interior surface; and
  map the at least one second image of the interior surface onto a second model of the interior surface, wherein an operator is able to select between the first model and the second model, interact with the model at least one of the first model and the second model, and selectively view different areas of the interior surface.

14. The controller in accordance with claim 13, wherein the first model comprises a three dimensional model and enables an operator to navigate views of the interior surface in at least three dimensions.

15. The controller in accordance with claim 13, wherein said controller is further configured to identify at least one feature of the interior surface based on the at least one first image of the interior surface.

16. The controller in accordance with claim 13, wherein said controller is further configured to:
  receive at least one characteristic of the wind turbine blade from the motorized apparatus, the motorized apparatus including a sensor configured to detect the at least one characteristic of the wind turbine blade;
  identify a structure within the interior cavity based on the at least one characteristic; and
  transmit instructions to the drive system which cause the drive system to alter at least one of a speed and a direction of travel of the motorized apparatus.

17. A method for inspecting at least one wind turbine blade, said method comprising:
  positioning the wind turbine blade in a substantially horizontal position;
  positioning a motorized apparatus within the wind turbine blade, wherein the motorized apparatus includes a camera;
  driving the motorized apparatus along a length of the wind turbine blade through an interior cavity defined by an interior surface of the wind turbine blade;
  capturing at least one first image of the interior surface;
  capturing at least one second image of the interior surface;
  mapping the at least one first image of the interior surface onto a first model;
  mapping the at least one second image of the interior surface onto a second model;
  displaying the first model on a display device;
  displaying the second model on the display device; and
  receiving an operator input, wherein an operator is able to select between the first model and the second model, interact with at least one of the first model and the second model, and selectively view different areas of the interior surface.

18. The method in accordance with claim 17, wherein positioning the wind turbine blade in a substantially horizontal position comprises positioning the wind turbine blade along a supporting surface in the horizontal position.

19. The method in accordance with claim 17, wherein the wind turbine blade is coupled to a rotatable hub of a wind turbine tower, and wherein positioning the wind turbine blade in a substantially horizontal position comprises rotating the hub about a rotation axis extending through the hub until the wind turbine blade is in a substantially horizontal position.

* * * * *